United States Patent [19]

Yoshinouchi et al.

[11] Patent Number: 5,004,905
[45] Date of Patent: Apr. 2, 1991

[54] CONTACT TYPE IMAGE SENSOR WITH A FIBER ARRAY COATED IN PART WITH AN ABSORBER

[75] Inventors: Atsushi Yoshinouchi, Kitakatsuragi; Masataka Itoh, Nara; Shuhei Tsuchimoto, Kitakatsuragi, all of Japan

[73] Assignee: Sharp Kabushiki Kaisha, Japan

[21] Appl. No.: 432,995

[22] Filed: Nov. 8, 1989

[30] Foreign Application Priority Data

Nov. 10, 1988 [JP] Japan .................. 63-286533
Feb. 28, 1989 [JP] Japan .................. 1-49650
Apr. 6, 1989 [JP] Japan .................. 1-89173

[51] Int. Cl.⁵ .......................... H01J 40/14
[52] U.S. Cl. ..................... 250/208.1; 250/227.20; 250/227.28
[58] Field of Search ............ 358/484, 471, 472; 250/227.2, 227.28, 208.1; 350/96.2

[56] References Cited

U.S. PATENT DOCUMENTS 3,265,892  8/1966  Sheldon ............... 250/227.2
4,408,230 10/1983  Tamura et al. ........ 358/213
4,671,612  6/1987  Sakurai et al. ....... 250/227.2
4,689,652  8/1987  Shimada et al. ...... 358/471

FOREIGN PATENT DOCUMENTS 0297798  1/1989  European Pat. Off. .
0299704  1/1989  European Pat. Off. .
55-163942 12/1980  Japan .
56-126369 10/1981  Japan .
62026971  2/1987  Japan .

OTHER PUBLICATIONS

A. Yoshinouchi et al., Application of Optical Fiber Array to Contact-Type Image Sensors (1989) Japan IEMT Symposium.

Primary Examiner—David C. Nelms
Assistant Examiner—Que Tan Le
Attorney, Agent, or Firm—Nixon & Vanderhye

[57] ABSTRACT

A contact type image sensor comprising a light-detecting element array formed on a substrate, a light source for irradiating an original to be read, and an optical fiber array disposed between said light-detecting element array and said original to be read, said optical fiber array being formed by laminating an optical fiber array member that is composed of optical fibers not coated with an absorber on an optical fiber array member that is composed of optical fibers coated with an absorber, said optical fibers being disposed between said light-detecting element array and said original to be read, and said light source being disposed at the light emission side of said optical fiber array, thereby attaining a precise irradiation of an original with light from a light source and reliably shuts off the leakage to maintain excellent resolution characteristics of the sensor.

9 Claims, 7 Drawing Sheets

FIG. 12
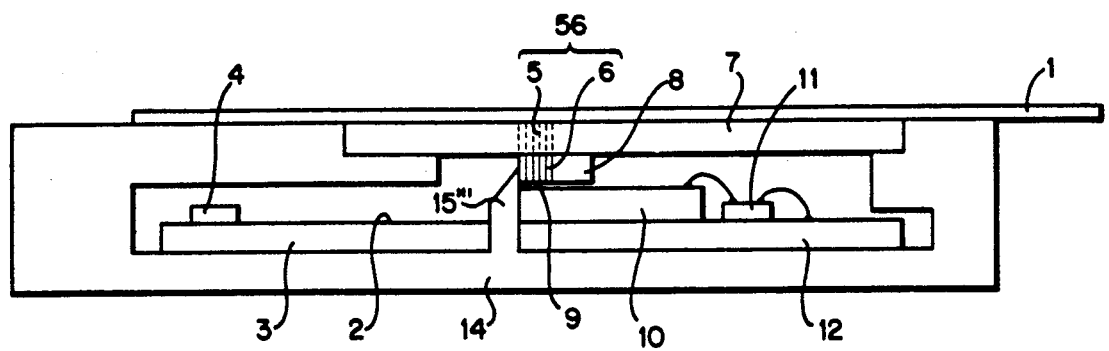
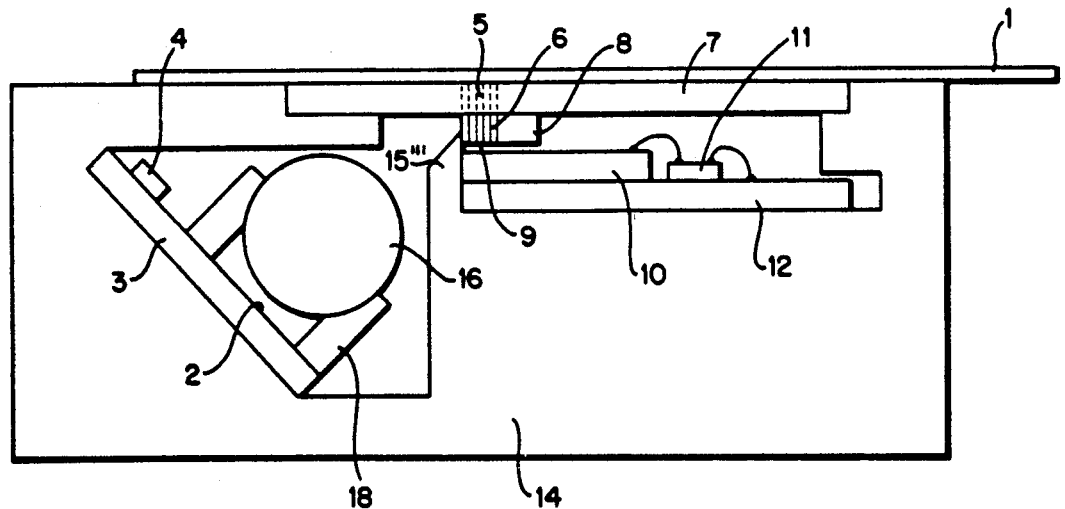
FIG. 13

CONTACT TYPE IMAGE SENSOR WITH A FIBER ARRAY COATED IN PART WITH AN ABSORBER

BACKGROUND OF THE INVENTION

1. Field of the Invention

The present invention relates to a contact type image sensor that is used in a facsimile or a letter or image read input apparatus.

2. Description of the Prior Art

Generally, the letter or image read input apparatus using a line sensor is so constructed that the information of an original copy illuminated by a fluorescent lamp or a light emitting diode (LED) array is image-formed on the sensor through an optical lens, a rod lens array or an optical fiber so that the original or sensor is moved to read the two-dimensional information. Such a conventional read input apparatus is constructed as a combination of a charge-coupled device (CCD) with the optical lens, or the combination of a long image sensor with the rod lens array and optical fiber array. Especially, the latter, called a contact type image sensor, has hitherto been in progress of development aiming at miniaturization and low manufacturing cost of the facsimile or the like.

However, most of the contact type image sensors perform an image-formation on the sensor through a rod lens array, thereby naturally limiting miniaturization. In such type, the original must be apart from the sensor only by the conjugate length of a rod lens array; usually, it is 20 to 30 mm in thickness as a unit of usual contact-type image sensor. Furthermore, the problem is created in that the use of such a lens system requires an optical adjustment and when read, chromatic aberration must be considered because light quantity transmission efficiency is low.

On the contrary, the sensor using an optical fiber array without such a lens system requires no optical adjustment, is large enough in light quantity transmission efficiency, and not focused, whereby the optical fiber is reducible in length so as to be suitable for micro-miniaturization. Furthermore, when color-read, no chromatic aberration occurs, so that the sensor is very effective. However, light incident on the optical fiber at an angle larger than an angular aperture does not create total reflection at the boundary with a clad and is transmitted to the adjacent fiber therethrough. When the optical fiber array transmits the image, leakage of the light leads to deterioration of the picture quality. Accordingly, with the aim of abosorption of the leakage light, an optical fiber array of extra mural absorption (EMA) type interposing an absorber between the optical fibers is designed, but when the array is used in the contact type image sensor, the problem is created in that the original to be read cannot be illuminated.

Also, in cases where a light-permeating substrate, such as a glass substrate, is used for a substrate on which a thin-film light-detecting element array if formed, the light from a light source, when entering into the light-permeating substrate and being incident directly on the thin-film light-detecting element array without passing through the original, becomes the leakage light, thereby creating the problem in that the leakage light deteriorates the read image.

SUMMARY OF THE INVENTION

The contact type image sensor of the present invention, which overcomes the above-discussed and numerous other disadvantages and deficiencies of the prior art, comprises a light-detecting element array formed on a substrate, a light source for irradiating an original to be read, and an optical fiber array disposed between said light-detecting element array and said original to be read, said optical fiber array being formed by laminating an optical fiber array member that is composed of optical fibers not coated with an absorber on an optical fiber array member that is composed of optical fibers coated with an absorber, said optical fibers being disposed between said light-detecting element array and said original to be read and said light source being disposed at the light emission side of said optical fiber array.

In a preeferred embodiment, the light-detecting element array is disposed at the end of said substrate, the light receiving surface of said light-detecting element array and the light emission surface of said optical fiber array face and are close to each other, and said light source is disposed in a space at the side reverse to the wire lead-out side of said substrate with respect to said light-detecting element array, whereby said original is irradiated with light from said light source.

In a preferred embodiment, the diameter of said optical fiber is made 40% or less of the resolution pitch of said light-detecting element array.

Also, the contact type image sensor of the invention comprises a light-detecting element array formed on a substrate, a light source for irradiating an original to be read, and an optical fiber array disposed between said light-detecting element array and said original to be read, wherein a light-shielding member is disposed between said light source and light-detecting element array.

Thus, the invention described herein makes possible the objectives of:

(1) providing a contact type image sensor that attains a precise irradiation of an original with light from a light source and reliably shuts off the leakage to maintain excellent resolution characteristics of the sensor;

(2) providing a contact type image sensor in which the use of an optical fiber array allows an extreme reduction of an optical path length, whereby the contact type image sensor can be made extremely more compact than a conventional rod lens array and moreover, a lens focusing operation is not required;

(3) providing a contact type image sensor in which, when a thin-film light-detecting element array is formed at the end of the substrate and the light source is disposed in a space at the reverse side to the wire lead-out side of the substrate with respect to the thin-film light detecting element array, the original can be irradiated with ease by compact construction;

(4) providing a contact type image sensor in which the use of an LED array light source without employing a rod lens attains a uniform illumination and miniaturization of the sensor unit;

(5) providing a contact type image sensor in which, when the diameter of each optical fiber is made less than 40% of the resolution pitch of the light-detecting element array, sufficient required solution characteristics can be obtained;

(6) providing a contact type image sensor in which a light-shielding member is disposed between the light source for irradiating the original and the light-detecting element array so as to prevent the light irradiated from the light source from directly irradiating the thin-film light-detecting element array without passing through the original, so that the contact type image sensor can provide a good quality picture quality; and (7) providing a contact type image sensor in which the light-shielding member is incorporated with a support substrate or a housing into one body, whereby the number of parts is reducible, the assembly thereof is easy so as to be suitably for mass production, and the reduction in thickness thereof is made possible.

BRIEF DESCRIPTION OF THE DRAWINGS

This invention may be better understood and its numerous objects and advantages will become apparent to those skilled in the art by reference to the accompanying drawings as follows:

FIG. 12 is a sectional view showing the third example, in which the housing and the light-shielding member are incorporated into one body.

FIG. 13 is a sectional view showing the third example of the invention, in which the housing and light-shielding member are incorporated into one body.

DESCRIPTION OF THE PREFERRED EMBODIMENTS

Example 1

Figure 1:
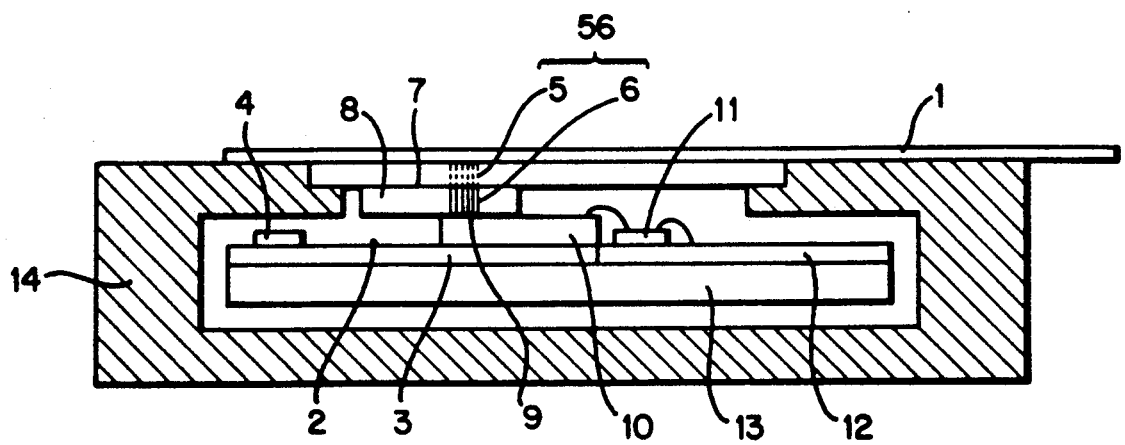
FIG. 1 is a sectional view showing the first example of a contact type image sensor of the present invention.

FIG. 1 shows a contact type image sensor of the invention, which comprises a thin-film light-detecting element array 9 formed on an insulating substrate 10, a light source 2 for irradiating an original 1 to be read, and an optical fiber array 56 disposed between the light-detecting element array 9 and the original 1. The light source 2 is composed of, for example, an LED array, which is installed onto a substrate 3. (e.g. to prevent excess current from flowing through the LED array light source 2) A resistance 4 is installed onto the substrate 3. The optical fiber array 56 is composed of optical fiber array members 5 and 6 that are made of a large number of optical fibers bundled in a band-like manner. Each fiber constituting the said optical fiber array member 5 is not coated with an absorber. Each fiber constituting the said optical fiber array member 6 is coated with an absorber. The reference numerals 7 and 8 designate light-permeating substrates assembling therein the optical fiber array members 5 and 6, respectively. The reference numeral 11 designates a driving large-scale intergration (LSI) packaged on a packaging substrate 12, 13 designates a support substrate serving also as a heat radiator for the LED array 2, and 14 designates a housing. The thin-film light-detecting element array 9 is formed at the end of the substrate 10, the light receiving surface of the array 9 and the light emission surface of the band-like optical fiber array member 6 are opposite and close to each other, and the LED array light source 2 is disposed in a space at the side nearest the thin-film light-detecting element array 9, (and opposite the side of substrate 10 which is wire-connected to LSI 11 as depicted in FIG. 1) to facilitate the original 1 being illuminated by light through the light-permeating substrates 8 and 7 and optical fiber array member 5 which has no absorber. the illuminated original information is transmitted to the thin-film light-detecting element array 9 through the fiber array members 5 and 6. The original information, when passing the optical fiber array member 5 that is not coated with an absorber, deteriorates in images due to the leakage light, and also passes the optical fiber array member 6 coated with the absorber, so that the unnecessary leakage light is cut off by the absorber, thereby transmitting the required image information only to the light-detecting element array 9. Accordingly, the light irradiated from the light source 2 and efficiently irradiate the original 1 and transmit the information to the light-detecting element array 9 without lowering the picture quality of image.

A manufacturing procudure of a contact type image sensor constructed as above-mentioned is described below.

In this example, an a-Si light detecting element of resolution of 8 pcs/mm is used as the light-detecting element array 9. The a-Si light-detecting element array 9 is formed on the insulating substrate 10 and bonded to one end of the substrate 3 on which the LED array is packaged. The packaging substrate 3 and substrate 12 packaging thereon a driving LSI 11 are fixed to the support substrate 13, and the lead-out wire of the a-Si light-detecting element array 9 and driving LSI 11 are connected with each other by means of wire bonds. Next, the light receiving surface of a-Si light-detecting element array 9 and the light emitting surface of optical fiber array 56 are disposed so as to be opposite and close to each other, and then both members are placed in the housing 14, resulting in a contact type image sensor of the present invention.

In the above-mentioned construction, an LED array light source (of, for example, wavelength of 570 nm at the light emission peak) without using any rod lens is used as the light source 2 to thereby attain miniaturization (for example, 8.5 mm thick, 35 mm wide and 256 mm long) of the sensor unit. Since the optical fiber array is used in the optical system, the light quantity transmission rate is sufficiently large, thereby obtaining sufficient illumanance at the sensor surface without using a rod lens for the light source. When an LED array having a peak wavelength of 570 nm is used, an illuminance of 100 lx at the sensor surface is obtained. Furthermore, it is advantageous that no use of a rod lens can further reduce unevenness of light emission at the surface of original.

Figure 2:
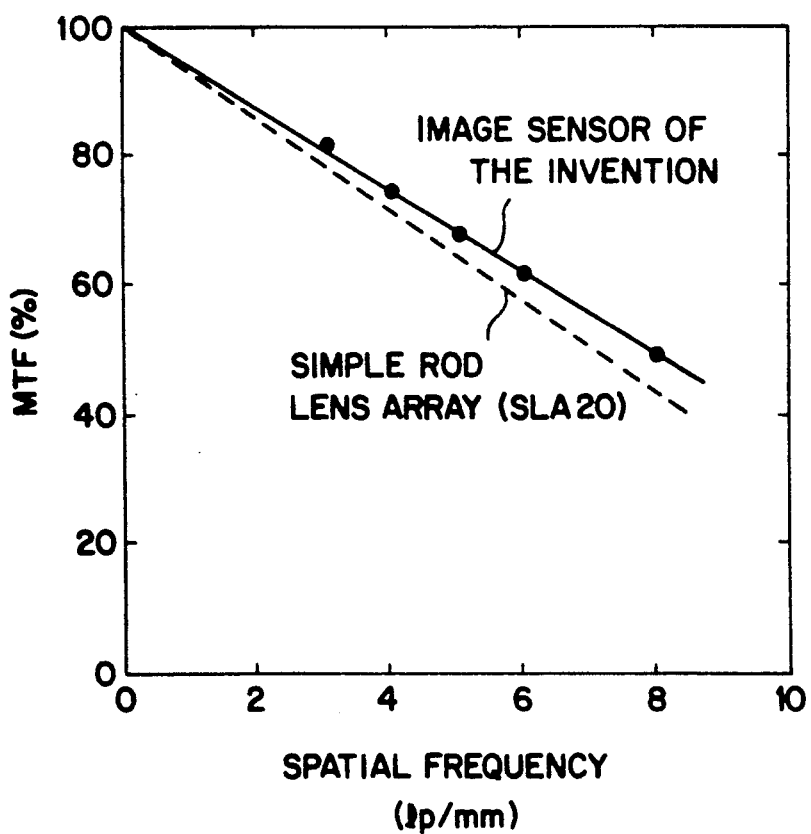
FIG. 2 is a graph showing the resolving power characteristics of the image sensor of FIG. 1.

The resolving power characteristics (MTF characteristics) of the manufactured contact type image sensor are shown in FIG. 2, which are as large as 50% at the spatial frequency of 8 lp/mm. For comparison, the resolving power charactristics of a simple rod lens array (SLA 20) often used as a conventional contact type image sensor are shown by the broken line in FIG. 2. The contact type image sensor, when using the rod lens array, is inferior in resolving power to the simple rod lens array, so it is understandable that the resolving power characteristics of this example of a contact type image sensor of the invention is extremely superior.

In this way, a contact type image sensor of high resolution, microminiature, needless of an optical adjustment, and suitable for mass production can be easily provided.

Example 2

Figure 3:
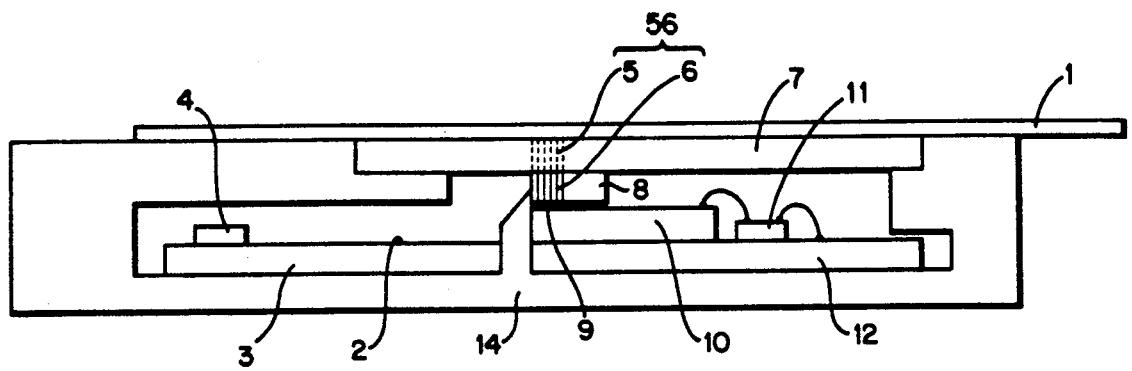
FIG. 3 is a sectional view showing the second example of a contact type image sensor of the present invention.

FIG. 3 shows another contact type image sensor of the invention, wherein the components designated by the same reference numerals as those in FIG. 1 are the same as or equivalent to those in FIG. 1.

This contact type image sensor is of the same construction as that in FIG. 1, except that a packaging substrate 12 is directly supported to the bottom of a housing 14.

The diameter of each optical fiber used for the respective optical fiber array members 5 and 6 is less than 40% of the resolution pitch of the thin-film light-detecting element array 9.

The reason for making less than 40% of the resolution pitch of the thin-film light-detecting element array the diameter of each optical fiber is described below.

Figure 4A:
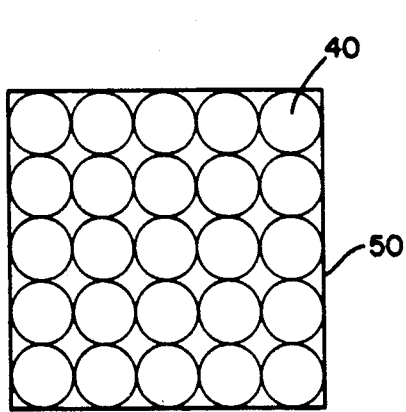
FIGS. 4a and 4b are diagrams showing the positional relationship between one bit area and an optical fiber array of the image sensor of FIG. 3.
Figure 4B:
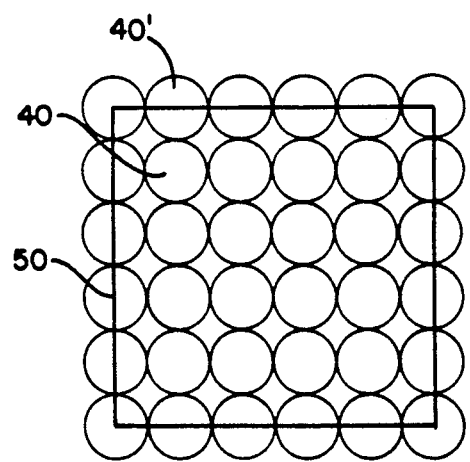
Figure 5:
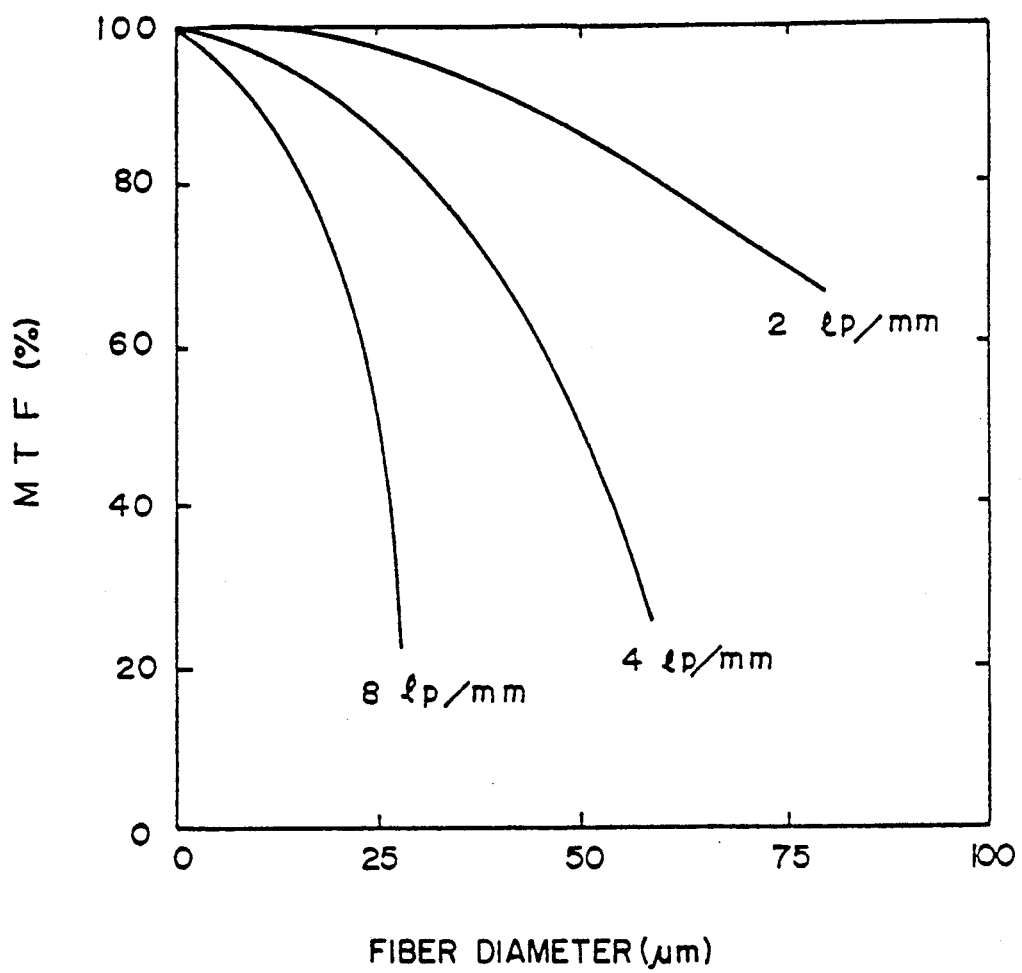
FIG. 5 is a graph showing the relation between the diameter of an optical fiber and the calculated value of modulation transfer function (MTF) of the optical fiber.

For example, when the resolution pitch of the light-detecting element array is 125 μm (corresponding to 8 bits/mm) and the diameter of each optical fiber is 25 μm, the positional relationship therebetween is such as that shown in FIGS. 4a and 4b, in which the reference numberals 40 and 40' designate the optical fibers, respectively, and 50 designates the area occupied by one bit of a light detecting element. In FIG. 4a, the most optical fibers are completely included in the area occupied by the one bit of a light detecting element, and in FIG. 4b, most optical fibers 40' are possessed in common with the adjacent bit, and the optical fibers 40 completely included in the area occupied by the one bit of a light detecting element are the least in number. Next, the worst case of FIG. 4b is considered. When the optical fibers 40' in common with the adjacent bit exist, the image information from the adjacent area is mixed and the image information may flow out from this bit to the adjacent one. By considering this, the relationship between the value of computing the modulation transfer function (MTF) of the optical fiber array and the diameter of optical fiber is shown in FIG. 5. For example, it is understood that in order to ensure 50% or more of the MTF value that is a practical sufficient value, when the spatial frequency is 4 lp/mm (a resolution pitch of 125 μm), the diameter must be 50 μm (40% of the resolution pitch) or less. For other resolution pitches, similarly, the diameter of the optical fiber must be 40% or less of the resolution pitch.

Figure 6:
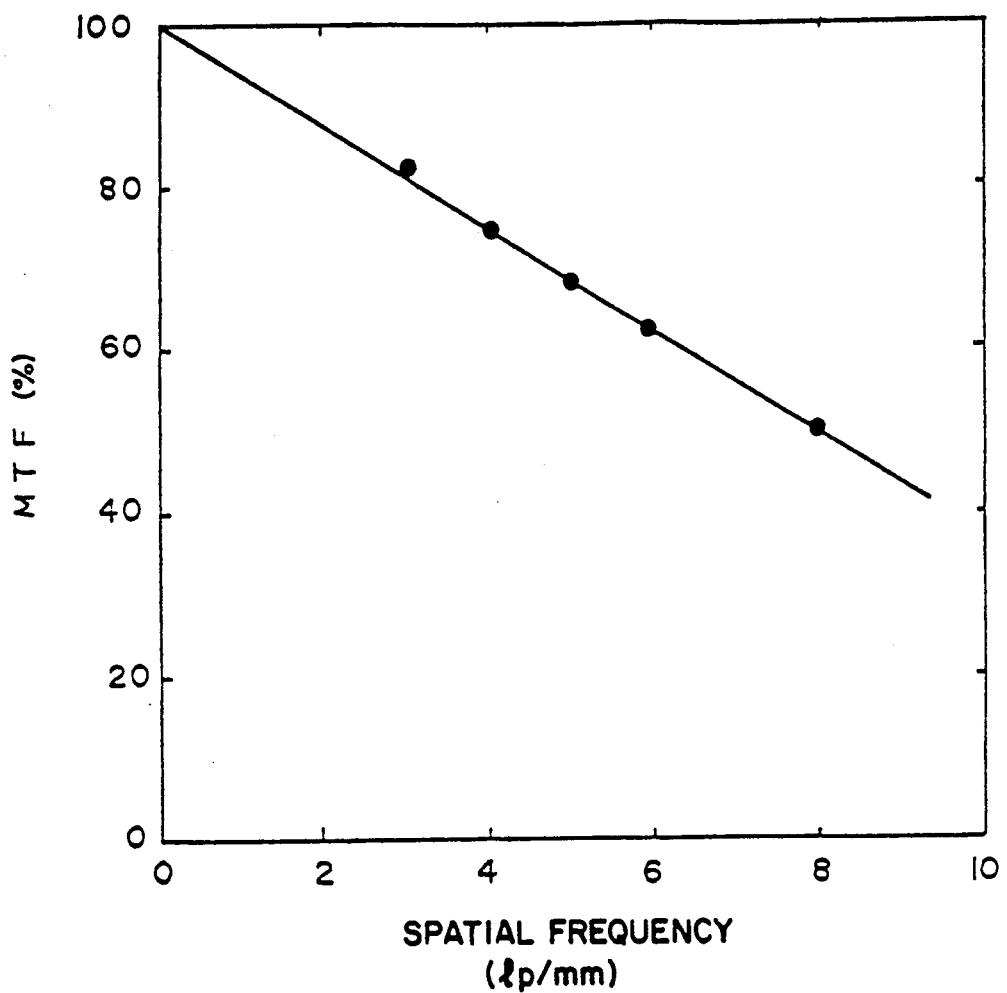
FIG. 6 is a graph showing the MTF characteristics of an optical fiber array when the optical fiber has a diameter of 25 $\mu$m.

FIG. 6 shows the measurement results of the optical fiber array MTF characteristics when an optical fiber of 25 μm in diameter is used. It is understood that it is possible to attain 50% of MTF value up to a spacial frequency of 8 lp/mm (a resolution pitch of 62.5 μm), in which a ratio of the diameter 125 μm) of the optical fiber to the resolution pitch (62.5 μm) thereof is 40%, which is quite well coincident with the above computation results.

A manufacturing procedure of the contact type image sensor mentioned above is described below. In this example, an a-Si light-detecting element array of 1728 dots (a resolution pitch 125 μm) at the resolving power of 8 bits/mm is used as the light-detecting element array 9. This contact type image sensor is manufactured the same as that of FIG. 1. In addition, the light receiving surface of a-Si light-detecting element array 9 and the light emission surface of optical fiber array 56 composed of optical fibers of 25 μm each in diameter are bonded by the use of a photocuring resin. The photocuring resin is used to enable the light receiving surface and light emission surface to be well optically bonded. The use of an adhesive of naturally curing type makes it difficult to perform defoaming when bonded, so that good optical bonding is impossible. An adhesive of the photocuring type can be cured after a fully defoaming process is completed, thereby achieving good optical bonding.

Figure 7:
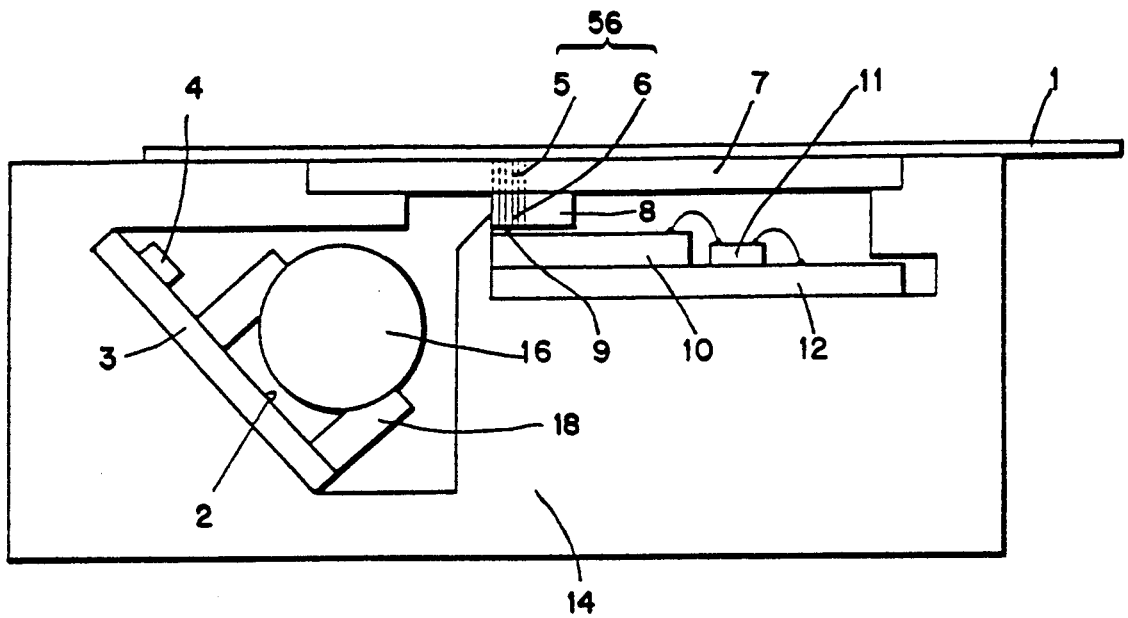
FIG. 7 is a sectional view showing another mode of the second example.

FIG. 7 shows a modified embodiment of this example in which an LED array light source having a rod lens 16 is used. The reference numeral 18 designates the lens holder that also acts as a reflecter. The use of rod lens 16 makes it impossible to microminiaturization the sensor unit and it increases unevenness of illuminance, but the illuminance at the sensor surface can be larger and the original can be illuminated only on a required area, so that stray light is reducible.

EXAMPLE 3

Figure 8:
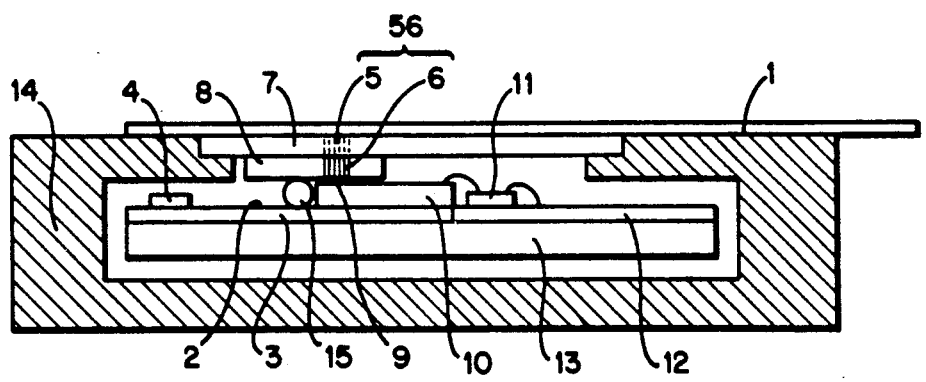
FIG. 8 is a sectional view showing the third example of a contact type image sensor of the present invention.

FIG. 8 shows another contact type image sensor of the invention, wherein the components designated by the same reference numerals as those FIG. 1 are the same as or equivalent to those in FIG. 1. This contact type image sensor is constructed the same as that of FIG. 1, except that a light-shielding member 15 is used for preventing thin-film light-detecting element array 9 from being directly irradiated with light from light source 2 without passing through an original. Light shield 15 is disposed between the light source 2 and the light-detecting element array 9.

A manufacturing procedure for the contact type image sensor mentioned above is described below. In this example, an a-Si light-detecting element array of 1728 dots at a resolving power of 8 pcs/mm is used as the light-detecting element array 9 and formed on a glass substrate 10 so as to be fixedly bonded onto a substrate 3 packaging an LED array 2 thereon. The substrates 3 and 12 are fixed onto a support substrate 13 and the lead-out wire of a-Si light-detecting element array 9 and the driving LSI 11 are connected by means of wire bonding. Also, the driving LSI 11 and wiring on the packaging substrate 12 are connected by means of wire bonding. The light receiving surface of the a-Si light-detecting element array 9 and the light emission surface of optical fiber array 56 are bonded by a photocuring resin. The photocuring resin is used to enable the light receiving surface and light emission surface to be optically well bonded. The use of an adhesive of a naturally curing type makes it difficult to perform defoaming when bonded, so that it is impossible to carry out good optical bonding. However, since the photocuring resin can be cured after a fully defoaming process is completed, good optical bonding is achieved. Next, the column-like light-shielding member 15 of black rubber of 1.2 mm in diameter is inserted in the position between light source 2 and the light-detecting element array 9, thereby preventing light from the light source 2 from being incident directly to the light-detecting element array 9 from the end face of the glass substrate 10. In this way, the contact type image sensor of the present invention is easy to manufacture.

Figure 9:
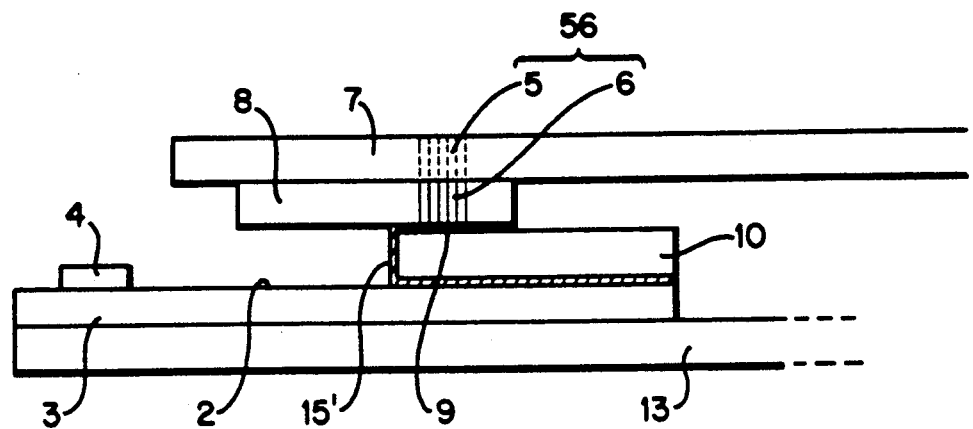
FIGS. 9 and 10 are sectional views showing other modes of the third example.
Figure 10:
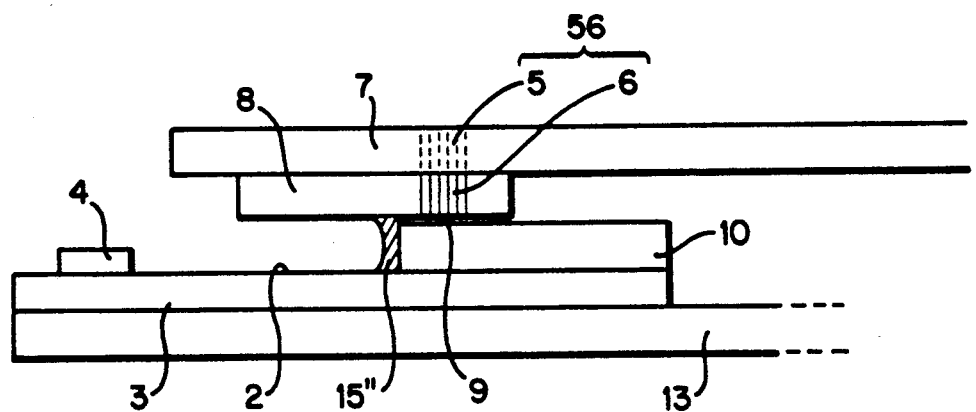
Figure 11:
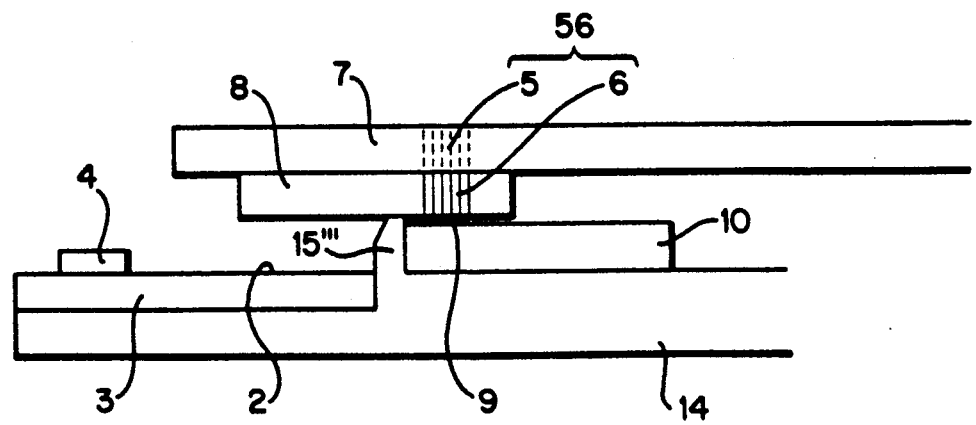
FIG. 11 is a sectional view showing the third example, in which a support substrate and a light-shielding member are incorporated into one body.

Other modified embodiments of this example of the invention are shown in FIGS. 9, 10 and 11, which have light-shielding members modified in construction respectively. In the embodiment in FIG. 9, a light-shielding member 15' of an L-like shape in section is used, which is formed of a resin or metal and fixedly bonded onto the glass substrate 10. In the embodiment in FIG. 10, a portion or portions other than the light emission surface of optical fiber array member 6 and the surface of substrate 3 are fixedly bonded by a resin or the like and thereafter a light-shielding resin, such as black resin is applied resulting in a light-shielding member 15. Also, the light-shielding member applied as a conductive resin can serve as an auxiliary electrode or a noise shield as well as the light-shielding member. The embodiment in FIG. 11 forms a light-shielding member 15''' that is incorporated with the support substrate 13 (FIG. 8) or the housing 14 into one body, in which a separate light-shielding member is not required, whereby an assembly process is reducible and the assembly is also easy.

FIG. 12 shows another embodiment of construction, the assembly of which is easier. One side of a light-permeating substrate 8 into which an optical fiber array member 6 coated with an absorber is incorporated is cut off (the side near the light source), so that a light-shielding member 15''' is easily formed and the irradiated light easily reaches, from an LED array light source 2, an area of the original 1 to be read (i.e., an area of the original 1 facing the light-detecting element array 9 and optical fiber array members 5 and 6). The light-shielding member 15''' is incorporated with a part of the housing 14 into one body, whereby the support substrate 13 as shown in FIG. 8 can be omitted, the number of parts is reduced so as to be suitable for mass production, and the thickness of the image sensor can be further reduced. For example, the unit size of the same is 5.4 mm in thickness, 32 mm in width and 255 mm in length.

In this example, an LED array light source (for example, a light emission peak wavelength of 570 nm) without the rod lens is used to facilitate miniaturization of the sensor unit. Since the optical fiber array is used in the optical system, the transmission rate is fully large, so that a sufficient illuminance at the sensor surface can be obtained without using any rod lens. When an LED array of the peak wavelength of 570 nm is used, a sensor surface illuminance of 100 lx is obtained. Furthermore, although an LED array light source with the rod lens causes unevenness of illuminance of about ±10% at the original, an LED array light source without rod lenses attains an unevenness of illuminance at the original that is reduced to about ±2%.

In this way, a contact type image sensor of high resolution, microminiature, needless of optical adjustment, and suitable for mass production, can easily be provided by the above-mentioned constitution.

FIG. 13 shows still another embodiment of this example in which an LED array light source with a rod lens 16 is used to irradiate the original 1 at a predetermined angle, in which a light-shielding member 15''' and a housing 14 are formed into one body. The reference numeral 18 designates a lens holder that also serves as a reflecter. The use of a rod lens 16 makes it difficult to miniaturize the sensor unit and makes the unevenness of illuminance large, but can further increase the illuminance at the sensor surface and illuminate a necessary area only of the original, so that stray light can be reduced. Also, it is advantageous that the number of chips at the LED is reduced and the manufacturing cost is lowered.

As seen from the above, the examples of the contact type image sensor of the invention use the optical fiber array that is composed of lamination of an optical fiber array member made of optical fibers each of which is coated with an absorber and an optical fiber array element made of optical fibers which are not coated with an absorber, thereby enabling precise irradiation of the light on the original with light and reliably shutting off the leakage light to maintain excellent resolving power characteristics. Also, the optical fiber is used to extremely reduced the optical path length, so that a remarkably compact contact-type image sensor, incomparison with a conventional image sensor using a rod lens array, can be attained and a focusing operation of lenses is not required. Moreover, the use of an LED array light source without employing rod lenses allows an uniform illumination and miniaturization of the sensor unit.

It is understood that various other modifications will be apparent to and can be readily made by those skilled in the art without departing from the scope and spirt of this invention. Accordingly, it is not intended that the scope of the claims appended hereto be limited to the description as set forth herein, but rather than the claims be construed as encompassing all the features of patentable novelty that reside in the present invention, including all features that would be treated as equivalents thereof by those skilled in the art to which this invention pertains.

What is claimed is:

1. A contact type image sensor comprising:
   a light-detecting element array formed on a substrate,
   a light source for irradiating an original to be read, and
   an optical fiber array disposed between said light-detecting element array and said original to be read,
   said optical fiber array including an optical fiber array member that is composed of optical fibers not coated with an absorber and an optical fiber array member that is composed of optical fibers coated with an absorber, said optical fiber array being disposed between said light-detecting element array and said original to be read, and
   said light source being disposed to direct light onto said original from which it is then reflected via said optical fiber array to said light-detecting element array.

2. A contact type image sensor according to claim 1, wherein:
   said light-detecting element array is disposed proximate an end of said substrate,
   a light receiving surface of said light-detecting element array and a light emission surface of said optical fiber array face are directed towards each other, and
   said light source is disposed in a space adjacent said end of said substrate, whereby said original is irradiated with light from said light source.

3. A contact type image sensor according to claim 1 or 2, wherein the diameter of said optical fibers is 40% or less of the resolution pitch of said light-detecting element array.

4. A contact type image sensor as in claim 1 further comprising a light-shielding member disposed between said light source and light detecting element array.

5. An image sensor comprising:
   a light source disposed to illuminate an original image to be sensed;
   an optical fiber array including two serially arranged subarrays,
   a first subarray having optical fibers not coated with a light absorber and disposed to let light from said source pass obliquely therethrough and to accept via its fiber ends light reflected from the original image, and
   a second subarray having optical fibers caoted with a light absorber and passing said reflected light via the optical fibers of the second subarray as received from the first subarray fibers; and
   a light-detector array disposed to accept said reflected light as it is output from said second subarray optical fibers.

6. An image sensor as in claim 5 wherein the diameter of said optical fibers is about 40% or less than the resolution pitch of said light-detector array.

7. An image sensor as in claim 5 wherein said light-detector array is disposed on and proximate an end of a substrate with electrical connection wires extending away from one side of the detector array and with said light source being disposed on the other opposite side of the detector array from said wires.

8. An image sensor as in claim 5 further comprising a light shield disposed between the light source and the light detector array.

9. An image sensor as in claim 7 further comprising a light shield disposed between said light source and said end of the substrate on which said light detector array is disposed.

* * * * *